United States Patent

[11] 3,580,142

[72] Inventors David K. Stock;
Robert J. Wech, Green Bay, Wis.
[21] Appl. No. 821,754
[22] Filed May 5, 1969
[45] Patented May 25, 1971
[73] Assignee FMC Corporation
San Jose, Calif.

[54] BAG STACK ACCUMULATING CONVEYOR
12 Claims, 9 Drawing Figs.
[52] U.S. Cl. ....................................... 93/33, 93/93
[51] Int. Cl. ....................................... B31b 1/14, B31b 1/64, B31b 1/98
[50] Field of Search ............................. 93/33, 93

[56] References Cited
UNITED STATES PATENTS
3,125,916  3/1964  Hayes ........................... 93/33
3,351,215  11/1967 Kitch ........................... 93/33X
3,395,622  8/1968  Kugler .......................... 93/33
3,431,828  3/1969  Crawford ....................... 93/93

Primary Examiner—Wayne A. Morse, Jr.
Attorneys—F. W. Anderson and C. E. Tripp

ABSTRACT: A machine produces bags from thermoplastic web by intermittently feeding and severing the web with a heated reciprocating seal bar. The time interval between two seal bar reciprocations represents a bag making cycle and the number of bag making cycles per minute is the production rate of the machine. Bags produced by the machine are discharged between stacking guides that constrain the bags to fall into a neatly registered stack on an index conveyor at the cyclical rate of bag production. When a predetermined bag count per stack is reached, bag production is interrupted for a period known as an interrupt cycle, during which the index conveyor moves the stack of bags, relative to the stacking guides, at a rate independently of the bag making cycle. Upon resumption of bag production, a second stack of bags is formed in shinglelike fashion relative to the first stack and the operation is repeated. Since indexing is performed during an interrupt cycle which is independent of the bag making cycle, the production rate of the machine can be increased to a maximum by using a bag making cycle that is less than an indexing time interval.

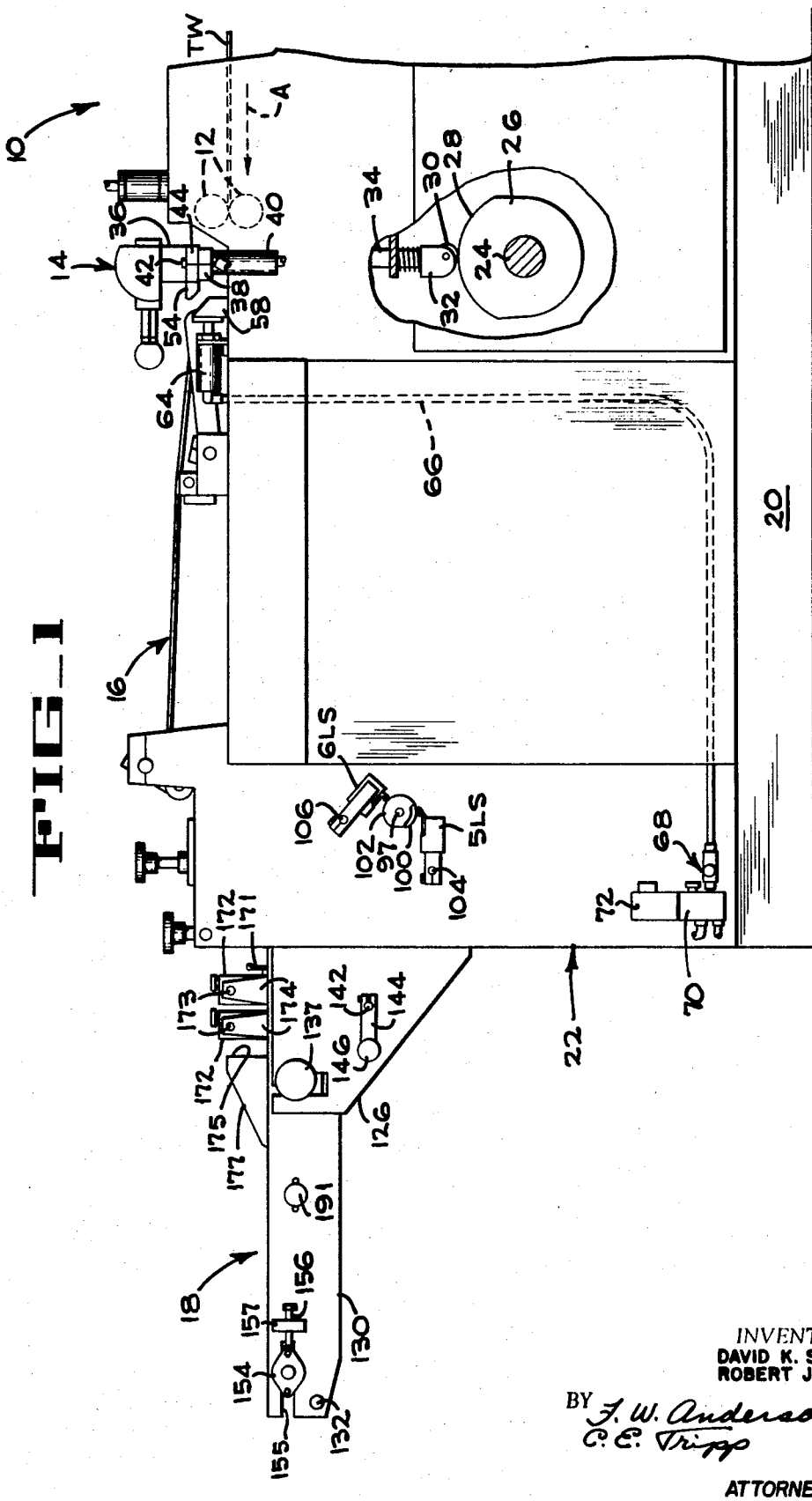

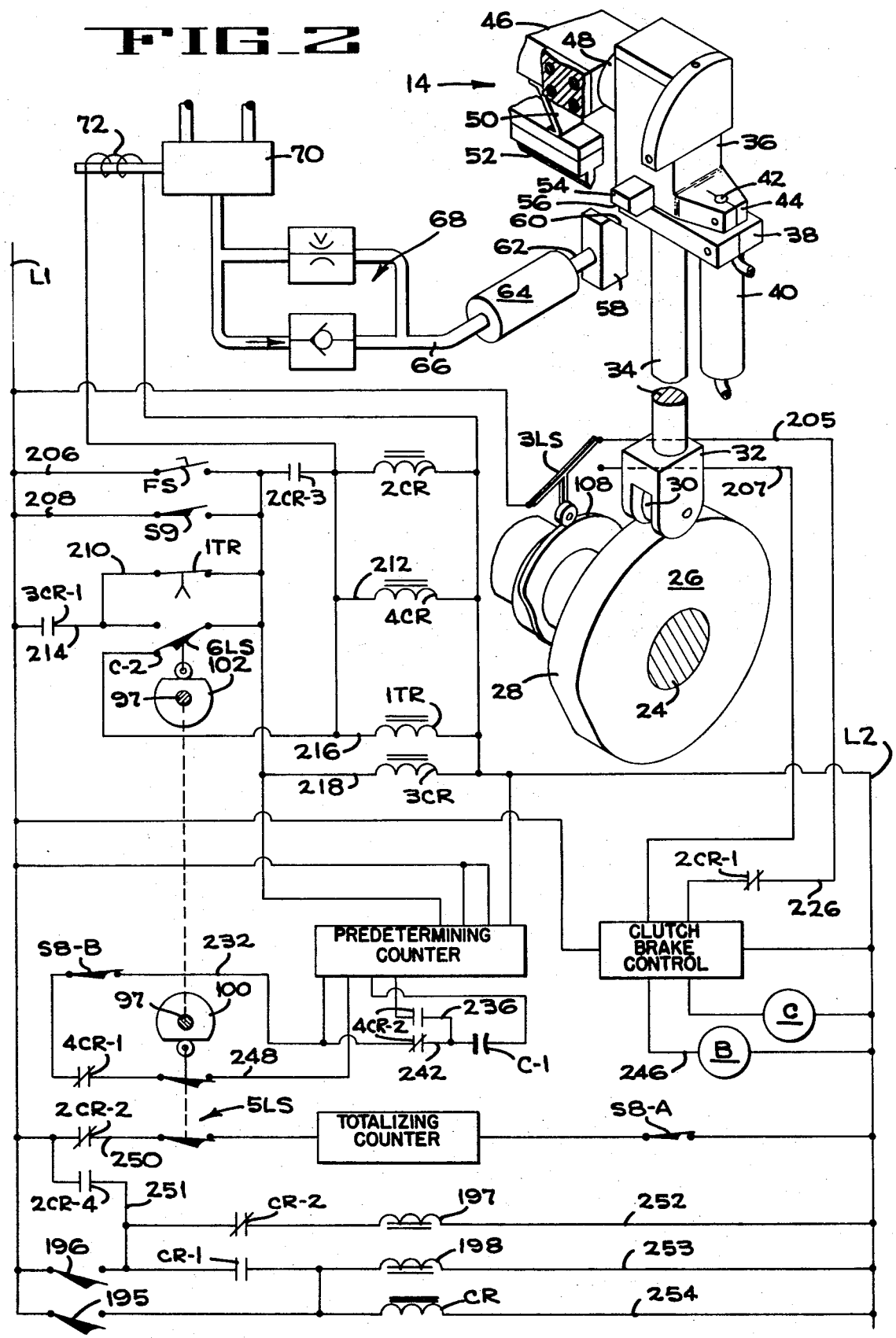

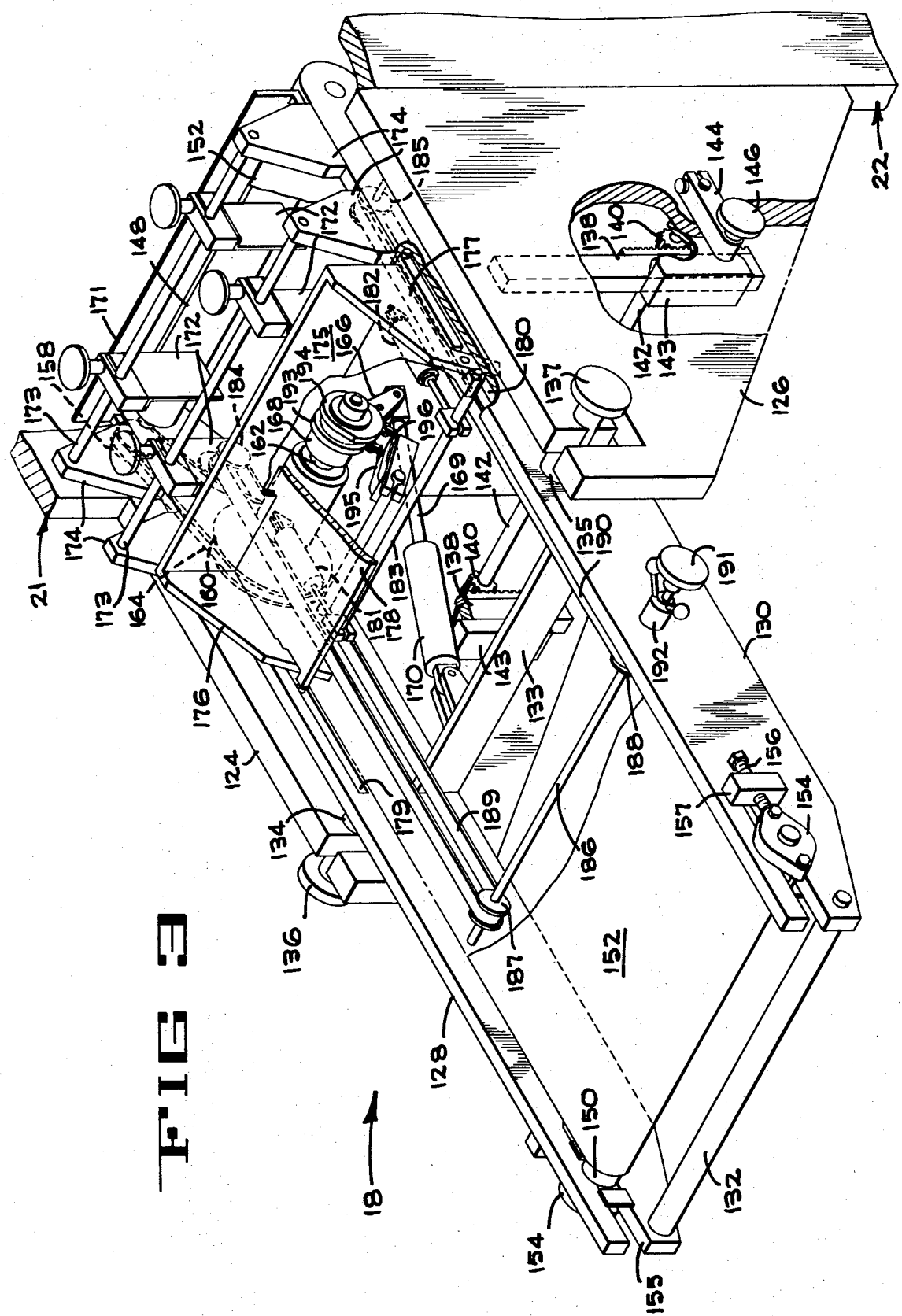

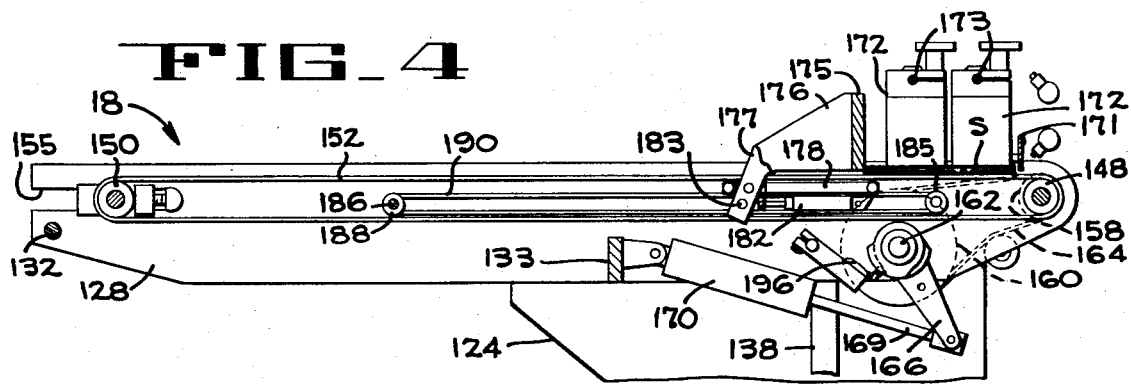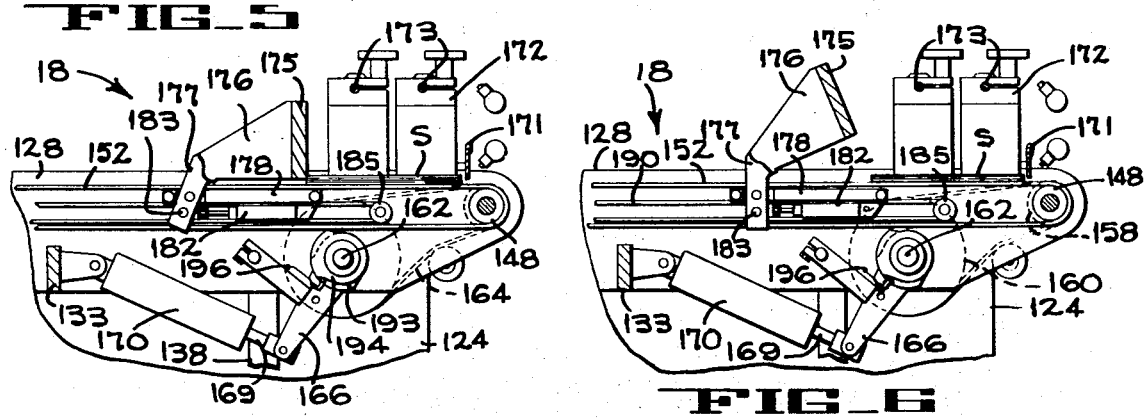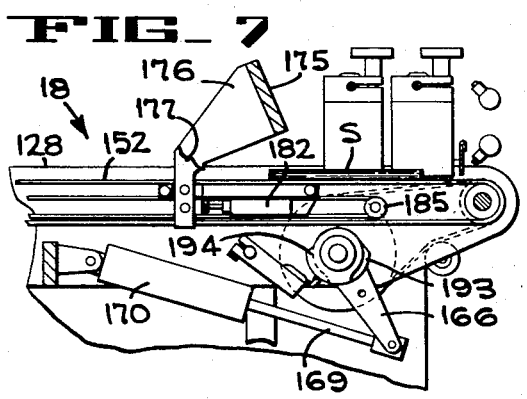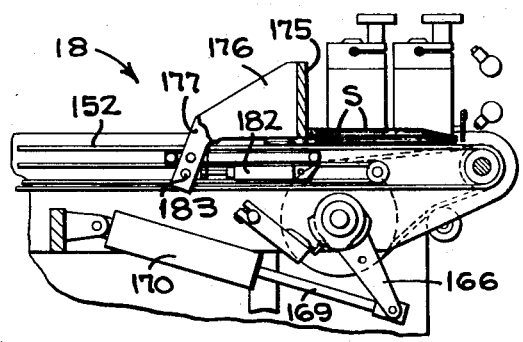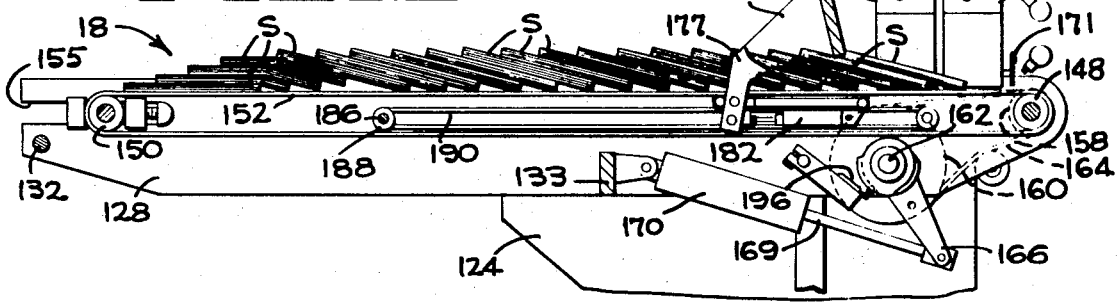

BAG STACK ACCUMULATING CONVEYOR

BACKGROUND OF THE INVENTION

1. Field of the Invention

This invention relates to bag machines and more particularly to a system that provides output storage for bags in shingled stacks having a predetermined bag count without limiting the rate of production to bag cycles that are equal to a stack indexing period.

2. Description of the Prior Art

Indexing conveyors have been used with bag machines to store the bag output in shingled stacks having a predetermined bag count per stack. This gives the operator a reasonable amount of time to unload the stacks, while maintaining the bag count per stack. Known indexing conveyors perform a sequence of operations for indexing a stack of bags during one bag cycle so that the bag machine can operate without interruption. This limits the bag cycle to a period in which the index conveyor can perform the stack indexing operation and thus, the production rate of the bag machine must be slowed down to a number of corresponding bag cycles per minute.

SUMMARY OF THE INVENTION

An index conveyor operates with a bag machine and production therefrom is not limited by the stack indexing period of the conveyor because upon reaching a predetermined bag count, bag production is automatically interrupted for a period enabling the conveyor to index. Thus, the bag machine operates at a rate of maximum bag production during formation of a stack and this production is interrupted only momentarily while indexing the conveyor. Since the number of bags in a stack greatly exceeds the number of bag cycles lost upon interrupt, the total bag production rate is increased.

Objects of the present invention are to provide a simplified index conveyor whereupon bags can be stacked at a maximum rate of bag production; to provide an index conveyor that efficiently indexes a stack of bags and maintains stack registration; and to provide output storage for a bag machine whereby the bag count is maintained and an operator has ample time to remove stacks.

BRIEF DESCRIPTION OF THE DRAWINGS

FIG. 1 is a side elevation of a bag machine embodying the present invention.

FIG. 2 is a schematic of the electrical control circuit for initiating an interrupt cycle and indexing the conveyor.

FIG. 3 is an enlarged perspective of the index conveyor portion of the bag machine shown in FIG. 1.

FIGS. 4—9 are schematics of the index conveyor during an interrupt cycle illustrating the indexing operation.

DESCRIPTION OF THE PREFERRED EMBODIMENTS

The present invention is related to the subject matter shown and described in the U.S. application of Robert J. Wech filed Sept. 16, 1968, Ser. No. 760,048 and the U.S. application of Donald C. Crawford and Robert J. Wech filed Dec. 30, 1968, and given Ser. No. 787,767. Both of these applications have been assigned to the assignee of the present invention and by reference thereto it is intended that they be incorporated herein.

Looking now at FIG. 1, a portion of a bag machine 10 is shown for processing a thermoplastic web designated by the letters TW. This web is pulled intermittently in the direction of arrow A by the draw rolls 12, shown in dotted line. Before reaching the draw rolls, the web has been folded and gusseted by mechanisms disclosed in the above Wech application. After passing through the draw rolls, the web is engaged by a reciprocating seal bar structure 14, the operation of which is coordinated with the intermittent movement of the thermoplastic web and such operation is effective to sever and weld the web along a line transverse to its direction of movement. An individual bag is formed and severed from the web with each reciprocation of the seal bar structure and the period between two seal bar reciprocations constitutes a bag making cycle. From the seal bar structure, bags are transported by a conveyor assembly 16 to an index conveyor 18, whereupon the bags are constrained to fall into a neatly registered stack. Upon reaching a predetermined count of bags per stack, bag production is interrupted and the index conveyor moves the stack in the direction of arrow A, before a subsequent stack is formed in shinglelike fashion thereon.

Details of the reciprocating seal bar structure 14, along with controls and the operation thereof, are shown and described in the above mentioned application of Crawford and Wech. Such details are disclosed herein to show the cooperative relationship between the seal bar structure and the index conveyor 18 as to enable an increase in the rate of bag production. Functions of this structure are to produce bags at a cyclical rate, to interrupt the cyclical rate of bag production for an interrupt period, and to resume the cyclical rate of bag production upon completion of indexing and termination of the interrupt period.

Bag machine 10 includes a base plate 20 from which a side frame 22 and a similar side frame 21, a portion of which is shown in FIG. 3, extend upward in spaced relationship. A drive shaft 24 extends transversely between the side frames and adjacent each frame, a plate cam 26 is keyed to the shaft. While only one plate cam is shown through that portion of the side frame broken away in FIG. 1, it will be understood that similar structure is provided adjacent each side frame for supporting the reciprocating seal bar 14.

Plate cam 26 has a high dwell portion 28 and supports a roller 30 that is rotatably mounted in a slotted block 32. A pushrod 34 has a lower end connected to the slotted block, while an upper end of the pushrod slidably fits within a mounting post 36 to provide relative movement between the pushrod and the mounting post under certain operative conditions as will later be explained. Rigidly attached to the pushrod is a plate 38 that extends laterally outward relative to side frame 22 and mounted to this plate is a double acting pneumatic actuator 40. The actuator is provided with a projecting rod 42 rigidly attached to an ear 44 which is an integral part of the mounting post. The mounting post normally rests in contact with the top of pushrod 34, but when the projecting rod of the actuator is extended, the mounting post is elevated above plate 38 and spaced from the top of the pushrod.

A beam 46, a portion of which is shown in FIG. 2, extends between the mounting posts 36 adjacent each side frame and each end of the beam is rotatably mounted to a post with a short stub shaft portion 48. A plurality of metal clips 50 are spaced at suitable intervals along the lower surface of the beam and support a seal bar 52 which severs and welds the thermoplastic web TW upon contact.

A block 54 is rigidly connected to mounting post 36 and has an inclined lower surface 56 that is adapted to be engaged upon interrupt to hold the seal bar 52 in an elevated position. A block 58 has an upper surface 60 that mates with surface 56 and is connected to an end of actuating rod 62 projecting from pneumatic cylinder 64.

Air pressure is supplied to the pneumatic cylinder through a conduit 66 having a flow control valve 68 and a valve 70 operated by a solenoid 72 in response to an electrical circuit.

Referring now to FIG. 2, an electrical circuit diagram is shown for controlling interruption of bag production. Power is supplied to the circuit by lines L–1 and L–2 and machine time pulses are established therein by operation of limit switches 5LS and 6LS. These limit switches are controlled by cams 100 and 102, respectively, that are fastened to a shaft 97 which extends transversely through side frame 22, as shown in FIG. 1. Limit switch 5LS is attached to a post 104 and limit switch 6LS is attached to a post 106. A limit switch 3LS is operated by a cam 108, shown in FIG. 2, mounted on shaft 24 and alternately contacts leads 205 and 207 for energizing, respectively, the clutch C and the brake B through a clutch-brake control.

A foot switch FS is provided in line 206 and upon closing this switch, relay 3CR in line 218 is energized. This closes normally open contact 3CR–1 in line 214 and when limit switch 6LS moves down engaging contacts C–2, relay 2CR in line 206 is energized. Energization of relay 2CR closes contacts 2CR–3 in line 206, opens normally closed contacts 2CR–1 in line 226, and opens normally closed contact 2CR–2 in line 250. Opening of contacts 2CR–1 in line 226 deenergizes the clutch and maintains the brake energized for interrupting web development. The opening of normally closed contacts 2CR–2 in line 250 disarms the totalizing counter.

Relay 4CR in line 212 and relay 1TR in line 216 are energized with relay 2CR. Energization of relay 4CR opens normally closed contacts 4CR–1 in line 248, closes normally open contacts 4CR–2 in line 236 and opens normally closed contacts 4CR–2 in line 242. Opening contacts 4CR–1 in line 248 disarms the predetermining counter circuitry. As long as foot switch FS in line 206 is closed, relay 2CR will be energized and brake B in line 246 will be energized. A toggle switch S9 in line 208 can also initiate and maintain an interrupt cycle.

By closing either the foot switch FS or toggle switch S9, solenoid 72 is energized operating valve 70 to admit air pressure to cylinder 66 through conduit 64 by the flow control valve 68. Piston rod 62 moves block 58 to a position under block 54 and seal bar 52 is thereby held in an elevated position.

A predetermining counter is electrically connected to a capacitor C–1 in line 242 which operates to reset the counter when relay 4CR is energized. When contacts 4CR–2 in line 236 are closed and contacts 4CR–2 in line 242 are opened, the capacitor discharges to reset the counter to its predetermined reading.

The time period of interrupt resulting from a momentary actuation of the foot switch is dependent upon the setting of time delay relay 1TR in line 216. After the time delay period, contacts 1TR open in line 210 and when limit switch 6LS engages contacts C2, relays 2CR, 4CR and 3CR are deenergized. When relay 2CR is deenergized, solenoid 72 is also deenergized and valve 70 is spring biased to return to a closed position. Contacts 3CR–1 in line 214 are opened when relay 3CR is deenergized and the machine resumes its normal clutch brake operation when contacts 2CR–1 close in line 226 as a result of the deenergization of relay 2CR in line 206. Contacts 4CR–2 in line 236, 4CR–2 in line 242 and 4CR–1 in line 248 return to the normal positions indicated in FIG. 2. Contacts 4CR–2 in line 236 disconnect capacitor C–1 from the predetermining counter reset coil and contacts 4CR–2 in line 242 connect capacitor C–1 to DC power for obtaining a charge to reset the counter on the next interrupt cycle.

In addition to the foot switch FS and toggle switch S9, an interrupt cycle can be initiated upon expiration of a preset count on the predetermining counter. This is the customary manner in which an interrupt cycle is initiated when the bag machine is operating with the index conveyor 18. Relay 3CR is energized upon expiration of the preset count and the resultant operation within the circuit is the same as when relay 3CR was energized by closing foot switch FS.

A suitable predetermining counter is manufactured by SODECO and sold through LANDIS & GYR Inc. of 45 West 45th Street, New York, New York. The model number of that counter is No. 2TCeF4PE. The clutch-brake control is made by Warner Electric Brake and Clutch Company of Beloit, Wisconsin and is identified by model number 8016–001–XXX.

Toggle switches S8–A in line 250 and S8–B in line 232 are provided to disconnect the totalizing counter in line 250 and the predetermining counter. These switches should be closed for operation of the bag machine with the index conveyor 18 which will now be described.

Index conveyor 18, shown in FIG. 3, is mounted on side frames 21 and 22 by brackets 124 and 126, respectively. A pair of longitudinal members 128 and 130, held in spaced relationship by spacers 132 and 133, form a conveyor frame that is pivotably mounted on the brackets by a stub shaft 134 projecting outward from the center of longitudinal member 128 and a stub shaft 135, projecting from the center of longitudinal members 130. A knob 136 is provided on stub shaft 134 and a knob 137 is provided on stub shaft 135 to lock the stub shafts in either of two vertically spaced positions relative to the brackets.

The conveyor frame is pivoted to a desired slope by a drive which will now be described. A rack 138 depends from longitudinal member 130 and the distal end thereof is in mesh with a pinion gear 140. The pinion gear is fastened to a shaft 142 which is journaled in brackets 124 and 126. A guide 143 is threadably fitted upon the shaft adjacent the pinion gear to slidably hold the rack in interlocking engagement therewith. A similar rack, pinion gear and guide, shown in FIG. 3, connect longitudinal member 128 with shaft 142. A handle 144 is fixed to the end of the shaft projecting outward from bracket 126 and a knob 146 is provided for turning the handle to rotate the shaft, the knob is attached to a spring loaded detent pin, not shown, that engages within bracket 126 to lock the handle in positions selected for desired conveyor frame slope.

A drive roller 148 extends between the ends of longitudinal members 128 and 130 that are located between brackets 124 and 126, while a driven roller 150 extends between the opposite ends of the longitudinal members. An endless belt 152 is trained about the rollers and the upper run of this belt provides the conveying surface for index conveyor 18. Tension within the endless belt can be adjusted by positioning driven roller 150, the ends of which are journaled in bearings 154. These bearings are slidably fitted in slots 155 that extend inward of each longitudinal member from the downstream end thereof and are positioned by contact with jack screws 156, threadably fitted through blocks 157 attached to the sides of the longitudinal members.

Index conveyor 18 is driven through a timing pulley 158, keyed to an end portion of drive roller 148 that projects outward on the opposite side of longitudinal member 128 from endless belt 152. A second timing pulley 160 is mounted on an outwardly projecting end of a shaft 162 that extends through longitudinal member 128 and a timing belt 164 is trained about the timing pulleys so that the drive roller is driven in response to rotation of the shaft 162. An index lever 166 is connected to an inward portion of the shaft through a one-way clutch 168 so that rotation of the lever in one direction only causes rotation of the shaft. The end of the index lever opposite from the clutch is connected to a normally extended actuating arm 169 projecting from an automatic return air cylinder 170 having an opposite end connected to spacer 133. When the actuating arm retracts into the cylinder, the clutch slips, but when the arm is driven outward to an extended position, the shaft is rotated and this rotation is transmitted to drive roller 148 and to move endless belt 152. The length of belt movement can be adjusted for either a 1½ inch index or 3 inch index by connecting the actuating arm in either of two radially spaced positions on the index lever.

Bags discharged from bag machine 10 are constrained to fall into a neatly registered stack on the index conveyor 18. A back stop 171 extends transversely above endless belt 152 and between longitudinal members 128 and 130 to define the rearmost limit of the stack. Guides 172 limit the sides of the stack and are slidably mounted on rods 173 that extend transversely above the endless belt and are connected to the longitudinal members 128 and 130 through brackets 174. These brackets are adjustably positioned along the longitudinal members by means, not shown, which could include projecting pins that fit into a series of spaced positioning holes in the longitudinal member or magnets attached to the bottom of the brackets. A gate 175 limits the forward edge of the stack and is supported by a pair of arms 176 and 177, pivotably mounted on a plate 178 which is located between the upper and lower reaches of the endless belt. Plate 178 is mounted on rollers fitted to roll within trackways 179 and 180 that extend lengthwise of longitudinal members 128 and 130. A pair of pneumatic cylinders 181 and 182 are connected to the plate and have actuating arms connected to a rod 183 that extends between arms 176 and 177. Thus, by operation of the pneumatic cylinders, the gate can be positioned in either a lower bag stopping position or an elevated position enabling the belt to index a stack of bags thereunder.

A control system is provided for moving gate 175 lengthwise of index conveyor 18 to accommodate bags of various lengths. Timing pulleys 184 and 185 are mounted on stub shafts that project inward from longitudinal members 128 and 130, respectively, at locations spaced upstream from the ends of trackways 179 and 180. A shaft 186 extends transversely between the longitudinal members at a point spaced from the downstream ends of the trackways and a pair of timing pulleys 187 and 188 are mounted thereon. A timing belt 189 is trained about pulleys 184 and 187 and the upper reach of this timing belt is connected to the plate 178. Similarly, a timing belt 190 is trained about pulleys 185 and 188 and the upper reach portion thereof is connected to plate 178. A control handle 191 and lock 192 are provided on the end of shaft 186 projecting outward from longitudinal member 130.

Controls are provided to operate gate 175 in conjunction with indexing movement of the conveyor 18 during an interrupt cycle of the bag machine 10. A pair of cams 193 and 194 are located on the hub of index lever 166. To open the gate, cam 193 actuates a microswitch 195 on the rise of the lobe when actuating arm 169 is near a fully retracted position. To close the gate, cam 194 actuates a microswitch 196 on the fall of the lobe when the actuating arm is near a fully extended position.

Looking again at FIG. 2, microswitch 195 is connected in series with contact relay CR in line 254 that extends between lines L–1 and L–2. Microswitch 196 is connected in line 253 with normally open contacts CR–1 and solenoid 198. Line 251 connects line 250 with line 253 and contains normally open contacts 2CR–4, while line 252 connects line 251 with line L–2 and contains normally closed contacts CR–2 and solenoid 197. Solenoid 197 operates a valve controlling air to cylinder 170, shown in FIG. 3, while solenoid 198 controls air supplied to pneumatic cylinders 181 and 182.

Relay 2CR in line 206 is energized upon initiation of an interrupt cycle. Thus, normally closed contacts 2CR–2 in line 250 are opened and normally open contacts 2CR–4 in line 251 are closed. Solenoid 197 is then energized, causing actuating arm 169 to retract within cylinder 170. Microswitch 196 is closed by cam 194 as the actuating arm starts to retract and when the actuating arm nears a fully retracted position, cam 193 closes microswitch 195. Solenoid 198 is energized to activate pneumatic cylinders 181 and 182 for lifting gate 175, while relay CR is energized to open normally closed contacts CR–2 in line 252 and close normally open contacts CR–1 in line 253.

Solenoid 197 is deenergized upon opening contacts CR–2 in line 252 and cylinder 170 is activated to extend actuating arm 169. As the actuating arm extends, endless belt 152 is driven for indexing a stack of bags under the elevated gate 175. Microswitch 195 opens as the actuating arm begins to extend and microswitch 196 opens when the actuating arm is near a fully extended position. Providing time delay relay 1TR has timed out and the interrupt period is over, relay CR is deenergized to close normally closed contacts CR–2 in line 252 and to open normally open contacts CR–1 in line 253. Solenoid 198 is deenergized, causing pneumatic cylinders 181 and 182 to retract for closing the gate.

This system combines production operations of bag machine 10 with operations of the index conveyor 18 to achieve maximum efficiency. Bags are produced by the machine at a maximum production rate and stacked on the index conveyor to form a stack having a predetermined bag count. Then the bag machine goes into an interrupt cycle and the index conveyor indexes the stack of bags during the interrupt period. Bag production is resumed and the operation is repeated.

FIGS. 4 through 9 show the sequence of operation of index conveyor 18. Bags produced by bag machine 10 fall into stack S between gate 175 and back stop 171 on the index conveyor, as shown in FIG. 4. Actuating arm 169 is in a normally extended position. In practice, stacks formed contain either 25 or 50 bags as a matter of choice. When a predetermined number of bags have been produced by the bag machine, an interrupt cycle begins.

Upon initiation of an interrupt cycle, actuating arm 169 retracts into automatic return air cylinder 170, as shown in FIG. 5. The time for retracting the actuating arm serves as a time delay so that the last bag produced by the bag machine can drop into stack S before gate 175 opens. When the actuating arm 169 is near the fully retracted position, gate 175 opens, as shown in FIG. 6. Then the actuating arm extends, as shown in FIG. 7, indexing stack S under the gate. Thereafter, the gate drops on the top of the indexed stack and a subsequent stack is formed, as shown in FIG. 8.

The indexing operation is repeated each time a subsequent stack is formed until bags are stored on index conveyor 18 in a shinglelike series of stacks, as shown in FIG. 9, with each stack having a predetermined bag count. It will be noted that as the stacks build up beneath gate 175, the gate is held in a partially elevated position but the downward pressure of the gate on the stacks is the same, regardless of stack height, because such pressure results from air pressure in pneumatic cylinders 181 and 182. Gate 175 can be mounted to arms 176 and 177 by means of slotted brackets, not shown, to maintain the gate in a substantially vertical position when elevated on top of the stacks. By keeping the gate parallel to back stop 171, a neater stack S can be produced.

Since the indexing operation is performed during an interrupt period which is independent of the duration of one bag making cycle, indexing does not limit the rate of bag production. Thus, the rate of bag production can be increased with each bag making cycle taking less time than an interrupt period. Stack indexing movement should be performed as rapidly as possible, without inertia effect overcoming stack registration, to reduce the interrupt period to a minimum. An overall increase in the rate of bag production will be achieved because there are 25 or 50 bag making cycles per stack and the time saved on the total number of bag making cycles per stack is greater than the time lost during an interrupt period.

An operator can extend the normal interrupt period by maintaining either foot switch FS or toggle switch S9 in a closed position. When either of these switches are closed, time delay relay 1TR will not time out. Thus, seal bar 52 is maintained in an elevated position stopping bag production and gate 175 is maintained in an elevated position. This is an optimum condition for clearing bag jams on the index conveyor 18 and the operator can quickly move stacks S from the vicinity of the gate by pulling on endless belt 152. The belt moves readily because one-way clutch 168 slips and after the stacks are out of the way, bag production can be resumed while the operator straightens out the stacks.

This maintained interrupt condition can also be helpful when stopping the bag machine. Because of safety factors, static eliminators are turned off when the bag machine is not running and as a result, bags in the conveyor assembly 16 do not properly settle on a stack. By using the maintained interrupt condition to clear the conveyor assembly before stopping the bag machine, this problem can be avoided.

Although the best mode contemplated for carrying out the present invention has been herein shown and described, it will be apparent that modification and variation may be made without departing from what is regarded to be the subject matter of the invention.

We claim:

1. A system for producing bags and storing the bags produced in stacks having a predetermined bag count per stack, said system comprising means for producing bags at a cyclical rate; means for stacking the bags produced at a rate corresponding to the cyclical rate of bag production until a predetermined bag count is reached per stack; means for interrupting the cyclical rate of bag production for an interrupt period upon reaching the predetermined bag count; means for indexing the counted stack of bags during the interrupt period which is independent of the duration of one bag making cycle; and control means for resuming the cyclical rate of bag production upon completion of indexing and termination of the interrupt period; whereby the cyclical rate of bag production per stack is independent of the indexing time interval.

2. A system for producing bags and storing the bags produced as described in claim 1, wherein the stack indexing means indexes a stack of bags with movement rates that maintain stack registration and the bag producing means makes bags at a cyclical rate with each bag making cycle taking less time than an interrupt period.

3. A system for producing bags and storing the bags produced as described in claim 2, wherein the predetermined bag count per stack requires a sufficient number of bag making cycles that the total time saved by forming a stack of bags with each bag making cycle taking less time than an interrupt period is greater than the time lost during an interrupt period.

4. A system for producing bags and storing the bags produced as described in claim 1, including manual control means for extending the interrupt period.

5. An index conveyor for a machine that produces bags from a thermoplastic web by intermittently feeding and severing the web with a heated reciprocating seal bar, actuation of the seal bar being interruptable for a period in which bag production is stopped while operation of the bag machine is maintained; said index conveyor comprising a frame; a pair of rollers mounted for rotation on said frame; an endless belt trained about said pair of rollers and having an upper reach portion positioned to receive bags produced by the machine; stack forming means positioned above the upper reach portion of said endless belt for constraining bags produced by the machine to fall into a neatly registered stack thereon; drive means connected to one of said pair of rollers for moving the upper reach portion of the endless belt relative to the stack forming means and thereby indexing a formed stack of bags with reference to a stack of bags to be subsequently formed within the stack forming means; and drive control means for actuating said conveyor drive means upon initiation of an interrupt period.

6. An index conveyor as described in claim 5 wherein said stack forming means includes a gate positioned transversely above the upper reach portion of the endless belt to restrain the forward edges of bags forming a stack within the stack forming means; said gate being mounted for movement between a lowered bag restraining position and a position elevated above the top of a formed stack of bags to enable indexing movement thereunder, and fluid actuating means for positioning said gate whereby a uniform downward pressure is maintained of said gate in a lowered position on the top of a stack of bags positioned thereunder regardless of the height of the stack.

7. An index conveyor as described in claim 6 wherein said gate is mounted for movement parallel with the upper reach portion of the endless belt to provide adjustment for accommodation of various size bags.

8. An index conveyor as described in claim 7 including a plate slidably mounted in the frame beneath the upper reach portion of the endless belt; said gate being pivotably supported on the plate and operated by the fluid actuating means that are attached to the plate; and a timing belt drive for moving the plate slidably within the frame as to position the gate at intervals along the upper reach portion of the endless belt for accommodating various size bags.

9. An index conveyor as described in claim 6 wherein said drive means include a drive train; a one-way clutch operably connected within the drive train; and an actuator operable connected through the one-way clutch for one-way operation of the drive train.

10. An index conveyor as described in claim 9 wherein said actuator has an actuating arm that is adapted for a cyclical reciprocating movement including a retraction stroke and an extension stroke; first control means energized by movement of the actuating arm to a position near the end of the retraction stroke to actuate the fluid actuating means for elevating the gate; and second control means energized by movement of the actuating arm to a position near the end of the extension stroke to actuate the fluid actuating means for lowering the gate.

11. An index conveyor as described in claim 10 wherein said actuator is regulated by said drive control means to commence a retraction stroke upon initiation of an interrupt period and said actuator automatically reverses operation commencing an extension stroke upon termination of the retraction stroke.

12. An index conveyor as described in claim 11 wherein said actuator is adjustable to vary the duration of the retraction stroke, whereby a time delay is provided between initiation of an interrupt period and elevating the gate to enable the last bag produced by the bag machine before the interrupt period to be stacked.